United States Patent
Jersenius et al.

(10) Patent No.: US 8,908,742 B2
(45) Date of Patent: Dec. 9, 2014

(54) USER EQUIPMENT, RADIO BASE STATION AND METHODS THEREIN FOR TRANSMITTING INFORMATION OF AN ALLOCATION OF A RADIO RESOURCE

(75) Inventors: Kristina Jersenius, Linköping (SE); Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/985,914

(22) PCT Filed: Feb. 17, 2011

(86) PCT No.: PCT/SE2011/050173
§ 371 (c)(1),
(2), (4) Date: Aug. 16, 2013

(87) PCT Pub. No.: WO2012/112089
PCT Pub. Date: Aug. 23, 2012

(65) Prior Publication Data
US 2013/0322493 A1    Dec. 5, 2013

(51) Int. Cl.
*H04B 1/00* (2006.01)
*H04W 72/04* (2009.01)
*H04B 1/713* (2011.01)
*H04W 72/08* (2009.01)

(52) U.S. Cl.
CPC ...... *H04W 72/0453* (2013.01); *H04W 72/0446* (2013.01); *H04B 1/713* (2013.01); *H04W 72/082* (2013.01)
USPC ........... 375/133; 375/130; 375/132; 375/135; 375/136

(58) Field of Classification Search
CPC ................... H04W 72/0453; H04W 72/0446; H04W 72/082; H04B 1/713; H04B 1/7143
USPC .......................... 375/130, 132, 133, 135, 136
See application file for complete search history.

(56) References Cited

U.S. PATENT DOCUMENTS

| | | | |
|---|---|---|---|
| 2008/0013599 A1* | 1/2008 | Malladi | 375/132 |
| 2010/0111139 A1* | 5/2010 | Arnott et al. | 375/133 |
| 2010/0195600 A1* | 8/2010 | Gorokhov et al. | 370/329 |

OTHER PUBLICATIONS

3GPP TS 36.211 V9.1.0 (Mar. 2010): "3rd Generation Partnership Project; Technical Specification Group Radio Access Network; Evolved Universal Terrestrial Radio Access (E-UTRA); Physical channels and modulation (Release 9)" Mar. 2010, 650, Route des Lucioles; F-06921 Sophia-Antipolis Cedex; France, pp. 1-85.

(Continued)

*Primary Examiner* — Leon Flores
(74) *Attorney, Agent, or Firm* — Myers Bigel Sibley & Sajovec, P.A.

(57) ABSTRACT

Embodiments herein relate to a method in a radio base station for transmitting information of an allocation of a radio resource allocated to a second user equipment. The radio base station is arranged to serve a first user equipment and the second user equipment in a cell of a radio communications network. The radio resource in the cell comprises Physical Resource Blocks that are organized in radio frames comprising subframes. The radio base station allocates a radio resource to the second user equipment in a subframe of the cell based on a frequency hopping scheme of the first user equipment. Also, the radio base station transmits a message to the second user equipment, which message indicates the allocated radio resource.

14 Claims, 9 Drawing Sheets

(56) References Cited

OTHER PUBLICATIONS

International Search Report, PCT/SE2011/050173, Dec. 6, 2011.
Written Opinion of the International Searching Authority, PCT/SE2011/050173, Dec. 6, 2011.
3GPP TS 36.211; "3$^{rd}$ Generation Partnership Project; Technical Specification Group Radio Access Network; Evolved Universal Terrestrial Radio Access (E-UTRA); Physical channels and modulation (Release 10)" Dec. 22, 2010, 3GPP Standard; Mobile Competence Centre; 650, Route des Lucioles; F-06921 Sophia-Antipolis Cedex; France, XP050462365, pp. 1-103.
3GPP TS 36.213; "3$^{rd}$ Generation Partnership Project; Technical Specification Group Radio Access Network; Evolved Universal Terrestrial Radio Access (E-UTRA); Physical layer procedures (Release 9)" Jun. 2010, 3GPP Standard; 650, Route des Lucioles; Sophia-Antipolis Cedex; France, pp. 1-80.
Alcatel-Lucent: "Signaling of Frequency Hopping for UL Transmission", 3GPP Draft; R1-073773, 3$^{rd}$ Generation Partnership Project (3GPP), Mobile Competence Centre; 650, Route des Lucioles; F-06921 Sophia-Antipolis Cedex; France, 3GPP TSG-RAN WG1 #50, Athens, Greece; Aug. 20-24, 2007; XP050107357, pp. 1-5.
Alcatel-Lucent: "Signaling of Slot Based Frequency Hopping for UL Transmission", Oct. 30, 2007; 3GPP Draft; R1-074986_UL_SLOT_BASEDFH1, 3$^{rd}$ Generation Partnership Project (3GPP), Mobile Competence Centre; 650, Route des Lucioles; F-06921 Sophia-Antipolis Cedex; France, 3GPP TSG-RAN WG1 #51, Jeju, Korea; Nov. 5-9, 2007; XP050108437, pp. 1-7.

\* cited by examiner

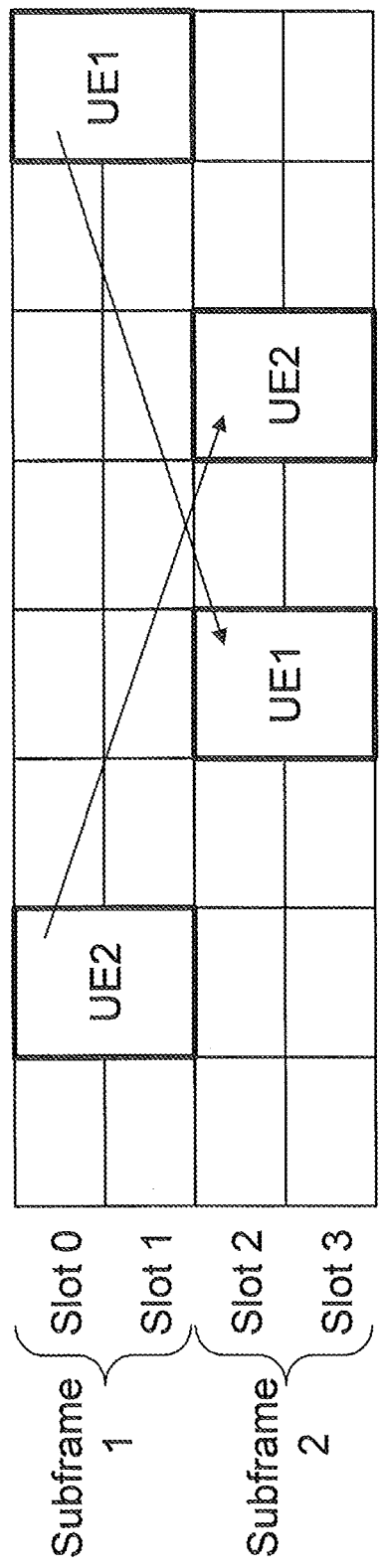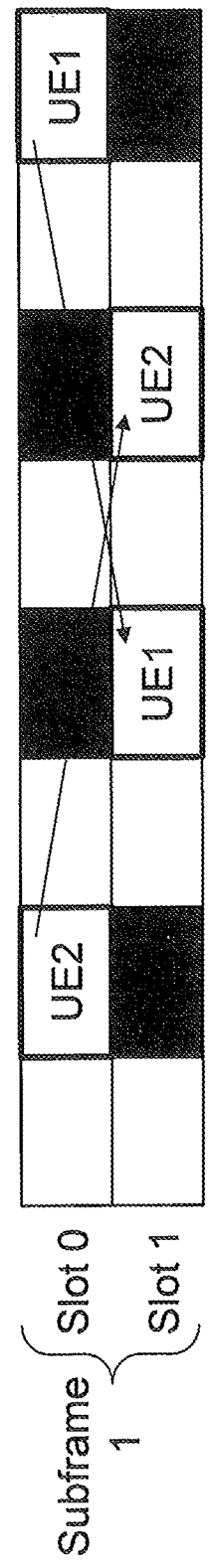

USER EQUIPMENT, RADIO BASE STATION AND METHODS THEREIN FOR TRANSMITTING INFORMATION OF AN ALLOCATION OF A RADIO RESOURCE

CROSS REFERENCE TO RELATED APPLICATION

This application is a 35 U.S.C. §371 national stage application of PCT International Application No. PCT/SE2011/050173, filed on 17 Feb. 2011, the disclosure and content of which is incorporated by reference herein in its entirety. The above-referenced PCT International Application was published in the English language as International Publication No. WO 2012/112089 A1 on 23 Aug. 2012.

TECHNICAL FIELD

Embodiments herein relate to a radio base station, a user equipment, referred to as a second user equipment, and methods therein. In particular, embodiments herein relate to transmit information of an allocation of a radio resource allocated to the second user equipment.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments are served in the cells by the respective radio base station and are communicating with respective radio base station. The user equipments transmit data over an air interface to the radio base stations in uplink (UL) transmissions and the radio base stations transmit data over an air interface to the user equipments in downlink (DL) transmissions.

Modem and future radio communications networks are expected to support more increasingly higher bit rates with even stricter requirements on the Quality Of Service (QoS). QoS may be defined as the ability to provide different priority to different applications, user equipments, or data flows, or to guarantee a certain level of performance to a data flow. In particular, the QoS in terms of coverage for uplink (UL) traffic is one of the most challenging areas to handle. This interest has increased due to the big interest of operators worldwide for supporting Voice over Internet Protocol (VoIP) services.

In addition to the more classical approaches such as power control and inter-cell interference coordination, frequency hopping is one of the low-complexity techniques that may offer gains in terms of frequency and interference diversity. In frequency hopping, a transmitting node, such as a user equipment, would change the assigned frequency resource allocation from one time instant to another, in a controlled manner. Two generic types of hopping for Long Term Evolution (LTE) are standardized in 3GPP:

Type 1, where frequency hopping is based on explicit frequency hopping information in the scheduling grant.
Type 2, where frequency hopping is performed according to cell-specific hopping and/or mirroring patterns.

For both types of frequency hopping defined above, inter-subframe hopping and intra-subframe hopping are possible. In inter-subframe hopping, a user equipment (UE) would change allocation every subframe as long as the grant is valid and frequency hopping is configured as shown in FIG. 1. Such mode of operation is typically straightforward to handle by the scheduler in the radio base station from a resource efficiency allocation perspective, because the frequency hopping resources in case of inter-subframe hopping do not cause any parts of the frequency spectrum to be unavailable for non-hopping user equipments, and as such both types of user equipments may easily co-exist over the whole BandWidth (BW) in a given Transmission Time Interval (TTI).

However, intra-subframe hopping may have detrimental effects on the frequency spectrum utilization as illustrated in FIG. 2. When a certain user equipment is configured for intra-subframe hopping, it means that it takes up one part of the bandwidth in the first slot of the subframe and another part of the bandwidth in the second slot of the subframe, and thereby makes two parts of the bandwidth unavailable for non-hopping users as illustrated by the black resources in FIG. 2. This will happen in all ills for which the grant is valid i.e. the first transmission attempt and all non-adaptive retransmissions and in case of semi-persistent scheduling for all first transmission attempts and non-adaptive retransmissions until semi-persistent scheduling is inactivated or the semi-persistent grant is updated.

In a radio communications network, hopping and non-hopping user equipments will typically be co-scheduled in the same TTI. A straightforward application of resource allocation for user equipments that utilizes frequency hopping in case of intra-subframe hopping or similar frequency hopping schemes may lead to inefficiencies in bandwidth utilization.

SUMMARY

An object of embodiments herein is to utilize radio resources in an efficient manner.

The object is achieved by a method in a radio base station for transmitting information of an allocation of a radio resource allocated to a second user equipment. The radio base station is arranged to serve a first user equipment and the second user equipment in a cell of a radio communications network. The radio resource in the cell comprises Physical Resource Blocks that are organized in radio frames comprising subframes. The radio base station allocates a radio resource to the second user equipment in a subframe of the cell based on a frequency hopping scheme of the first user equipment. The radio base station also transmits a message to the second user equipment, which message indicates the allocated radio resource.

According to another aspect the object is achieved by providing a radio base station for transmitting information of an allocation of a radio resource allocated to a second user equipment. The radio base station is arranged to serve the first user equipment and the second user equipment in the cell of a radio communications network. The radio resource in the cell comprises Physical Resource Blocks that are organized in radio frames comprising subframes. The radio base station comprises a scheduler configured to allocate a radio resource to the second user equipment in a subframe of the cell based on a frequency hopping scheme of the first user equipment. The radio base station further comprises a transmitter configured to transmit a message to the second user equipment, which message indicates the allocated radio resource.

According to another aspect the object is achieved by a method in a second user equipment for receiving information of an allocation of a radio resource allocated to the second user equipment in a radio communications network. In the radio communications network the radio base station serves the first user equipment and the second user equipment in the cell of the radio communications network. The radio resource in the cell comprises Physical Resource Blocks that are organized in radio frames comprising subframes. The second user equipment receives a message from the radio base station, which message indicates an allocated radio resource. The radio resource has been allocated to the second user equipment in a subframe of the cell based on a frequency hopping scheme of the first user equipment. The second user equipment also transmits data to the radio base station using the allocated radio resource.

According to another aspect the object is achieved by providing a second user equipment for receiving information of an allocation of a radio resource allocated to the second user equipment in a radio communications network. The second user equipment is configured to be served in a cell controlled by the radio base station, which cell also serves the first user equipment. The radio resource in the cell comprises Physical Resource Blocks that are organized in radio frames comprising subframes. The second user equipment comprises a receiver configured to receive a message from the radio base station, which message indicates an allocated radio resource. The radio resource has been allocated to the second user equipment in a subframe of the cell based on a frequency hopping scheme of the first user equipment. Furthermore, the second user equipment comprises a transmitter configured to transmit data to the radio base station using the allocated radio resource.

Embodiments herein aim at a more efficient frequency spectrum utilization when, for example, intra-subframe hopping or similar is configured, resulting in having to share the frequency spectrum between hopping and non-hopping user equipments. This is done through allocating resources for the second user equipment based on the frequency hopping schemer of the first user equipment. In some embodiments the resource allocation is performed such that the user equipments will hop into each other's complementary slots. Thus, the radio resources are used in an efficient manner and the amount of radio resources that cannot be utilized by user equipments without frequency hopping scheme is reduced.

BRIEF DESCRIPTION OF THE DRAWINGS

Embodiments will now be described in more detail in relation to the enclosed drawings, in which:

FIG. 1 is a schematic overview of a Type 1 inter-subframe hopping with a frequency hopping offset of 0.5 of available bandwidth, FIG. 2 is a schematic overview of a Type 1 intra-subframe hopping with a frequency hopping offset of 0.5 of available bandwidth.

DETAILED DESCRIPTION

Figure 3:
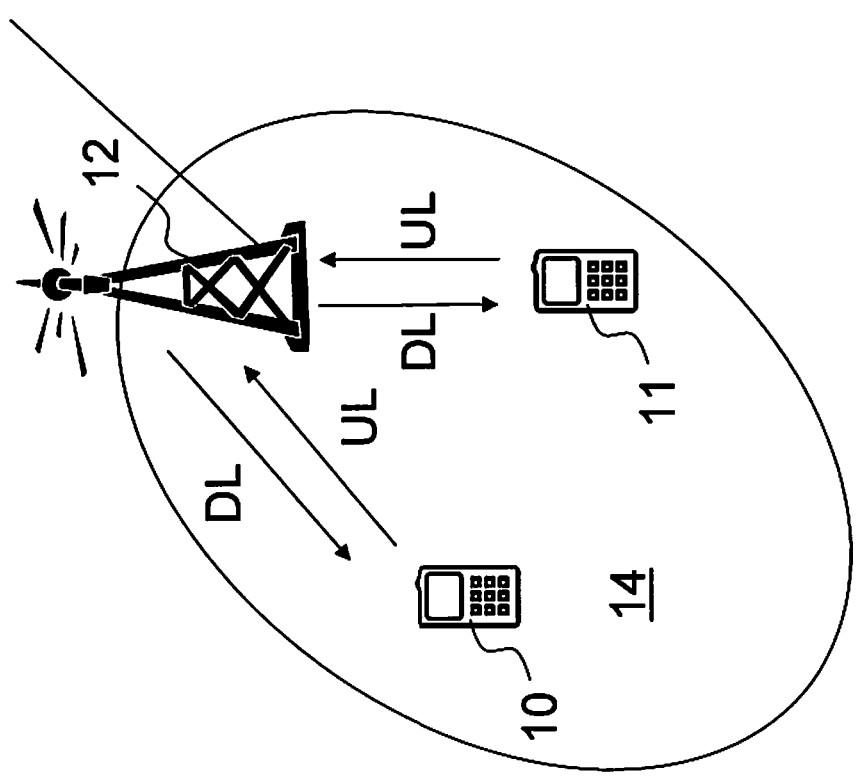
FIG. 3 is a schematic overview of a radio communications network.

FIG. 3 is a schematic overview of a radio communications network using a technology, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network comprises a radio base station 12 providing radio coverage over at least one respective geographical area forming a cell 14. A first user equipment 10 and a second user equipment 11 are served in the cell 14 by the radio base station 12 and are communicating with the radio base station 12. The user equipments 10,11 transmit data over an air interface to the radio base station 12 in uplink (UL) transmissions and the radio base station 12 transmits data over an air interface to the user equipments 10,11 in downlink (DL) transmissions.

The radio base station 12 schedules transmissions to and from the user equipments by allocating radio resource for the first user equipment 10 and the second user equipment 11. Embodiments herein aim at achieving an efficient frequency spectrum utilization through carefully planning which radio resources should be allocated for user equipment using a frequency hopping scheme or algorithm when intra-subframe hopping is utilized.

The radio base station 12 receives a scheduling request from the first user equipment 10 and schedules a radio resource to the first user equipment 10 in a time slot. Then the radio base station 12 receives a scheduling request from the second user equipment 11 and schedules, based on a frequency hopping scheme of the first user equipment 10, a radio resource to the second user equipment 11 so that the radio resource scheduled to the second user equipment 11 is a radio resource scheduled to the first user equipment 10 in a second time slot according to the frequency hopping scheme of the first user equipment 10. The information of the scheduling or allocating is then transmitted to the second user equipment 11.

Thus, the radio resources are efficiently utilized and the frequency spectrum is better utilized.

Figure 4:
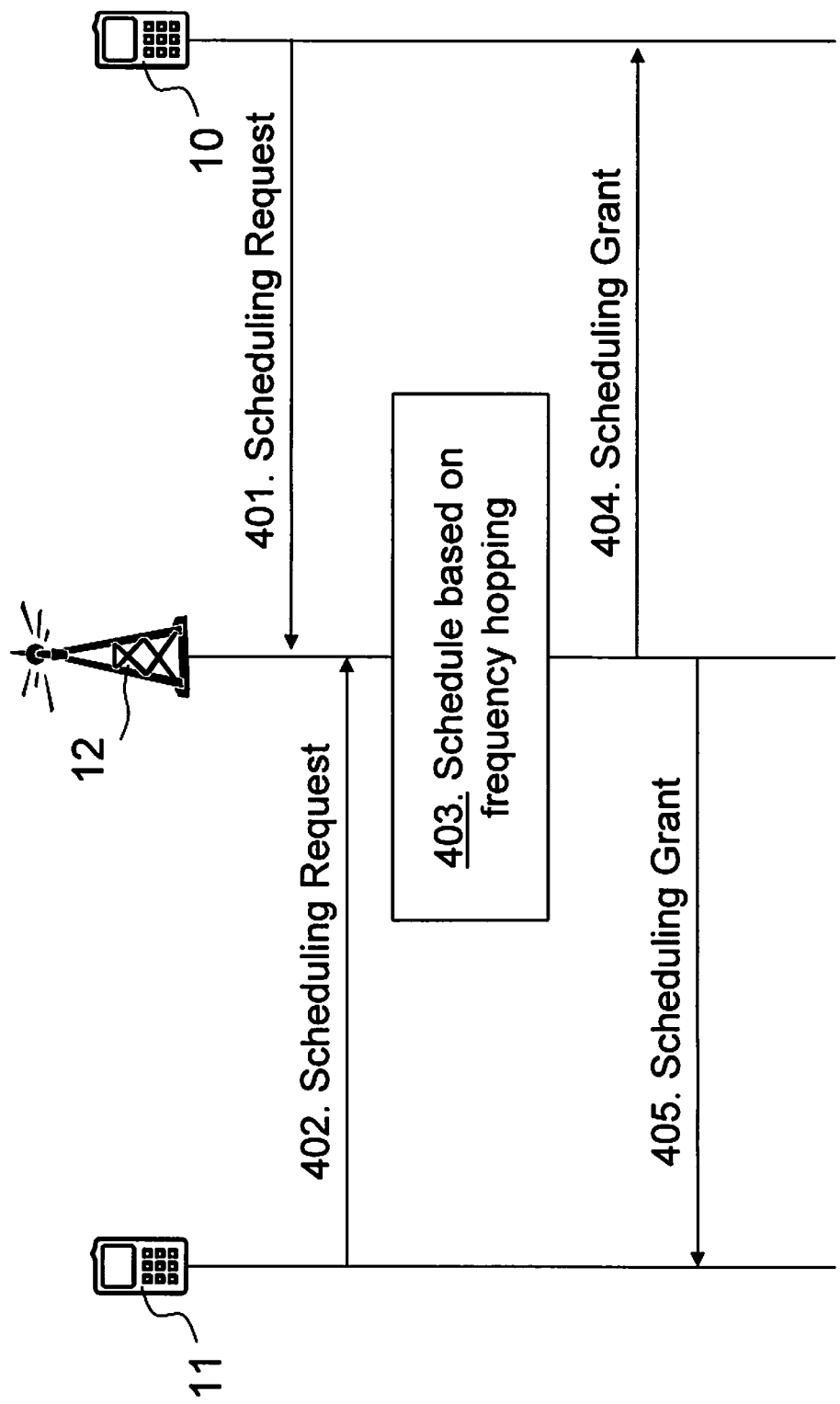
FIG. 4 is a combined flowchart and signalling scheme in a radio communications network.

FIG. 4 is a combined flowchart and signaling scheme in the radio communications network. The steps do not have to be taken in the order stated below, but may be taken in any suitable order.

Step 401. The first user equipment 10 may transmit a scheduling request to the radio base station 12. For example, the first user equipment 10 transmits a scheduling request to initiate data uplink transfer over a Physical Uplink Control Channel (PUCCH).

Step 402. The second user equipment 11 may transmit a scheduling request to the radio base station 12, e.g. for uplink transmissions as well.

It should be noted that steps 401 and 402 are not necessary. The radio base station 12 may send scheduling grants to the user equipments without having received any scheduling requests.

Step 403. The radio base station 12 schedules radio resources to the first user equipment 10 and the second user equipment 11. The radio base station 12 allocates a radio resource to the first user equipment 10 in a time slot of a subframe. The first user equipment 10 as well as the second user equipment 11 uses a frequency hopping scheme. The frequency hopping scheme may be an intra subframe hopping scheme.

The frequency hopping scheme may be a Type 1 scheme, which is based explicit on frequency hopping information in the scheduling grant. The frequency hopping scheme may alternatively be a Type 2 scheme where frequency hopping is performed according to cell-specific hopping and/or mirroring patterns. In either case the radio base station 12 is aware of the frequency hopping scheme of the served first and second user equipments 10,11.

The radio base station 12 allocates the radio resource to the second user equipment 11 based on the frequency hopping scheme of the first user equipment 10. For example, the radio base station 12 allocates a first radio resource to the first user equipment 10 in a first time slot of a subframe. The radio base station 12 knows that the first user equipment 10 uses a frequency hopping scheme where e.g. the next radio resource is allocated half of the available bandwidth away from the first radio resource. The radio base station 12 then allocates an initial radio resource of the second user equipment 11 to the radio resource in the first time slot of the subframe, which radio resource corresponds to the next radio resource allocated to the first user equipment in the second time slot. The radio base station 12 thus allocates radio resources in an efficient manner. In some embodiments, the radio base station 12 may use a Relative Allocation Offset (RAO) value to allocate the radio resources, as explained in FIG. 5.

Step 404. The radio base station 12 may transmit a scheduling grant to the first user equipment 10. The scheduling grant may be transmitted in a Downlink Control Information (DCI) message or similar. An uplink scheduling grant in the DCI message may comprise a flag for indicating frequency hopping is on or off. Thus, the first user equipment 10 may receive a grant with information of the allocation of the radio resource in form of a virtual resource allocation. This virtual resource allocation is then mapped to one physical resource allocation in the first slot and to another physical resource allocation in the other slot depending on the frequency hopping type. For example, an information field for a resource block assignment carried on a Physical Data Control Channel (PDCCH) comprises a Resource Indication Value (RIV) from which a starting virtual resource block and a length in terms of contiguously allocated virtual resource blocks may be derived.

Step 405. The radio base station 12 transmits a scheduling grant to the second user equipment 11. The scheduling grant may be transmitted in a Downlink Control Information (DCI) message or similar. An uplink scheduling grant in the DCI message may comprise a flag for indicating frequency hopping is on or off. Thus, the second user equipment 11 may receive a grant with a virtual resource allocation. This virtual resource allocation is then mapped to one physical resource allocation in the first slot and to another physical resource allocation in the other slot depending on the frequency hopping type.

In the above, the case of individual user equipments frequency hopping into each others' complementary radio resources of different time slots is disclosed. However, the Physical Resource Blocks PRBs of the first or second user equipment could effectively represent the PRBs of a group of user equipments, i.e. more than one user equipment, that were grouped together in order to achieve a comparable number of PRBs for the different groups. Such an approach would easily be handled. In general, grouping user equipments together would result in a more contiguous bandwidth allocation, leading to less frequency spectrum fragmentation. Thus, if an ungrouped user equipment needs transmission/reception to be scheduled, the amount of radio resources that can be scheduled to this user equipment will not be limited by any frequency spectrum fragmentation.

When it is known a-priori that a grant is valid for several TTIs e.g. utilizing TTI bundling, embodiments herein may be utilized for the case of Type 2 in order to further increase the frequency diversity. For example, consider a scheduling grant that is valid for X TTIs. In this case, one solution is to have 2*X user equipments for which the frequency hopping is configured. By utilizing the RAO, see FIG. 5, conveniently, it will be possible to let each user equipment frequency hop into another radio resource of another user equipment throughout the lifetime of the grant. Embodiments may also be used in the case that it is not a-priori known that a grant is valid for several TTIs, by assuming that the grant will be valid for a certain number of Ills. A scheduling grant is scheduled to the first user equipment 10. The scheduling grant includes a resource allocation and is valid for one or more transmission time intervals; sometimes this is known a-priori, sometimes it is not known. The number of transmission time intervals that the grant is valid may be taken into account when scheduling the radio resource to the second user equipment 11. It should be noted that it may not only be the number of transmission time intervals of the first user equipment that is of interest, but the number of transmission time intervals of all user equipments with intra-subframe hopping within the cell.

In some embodiments both user equipments 10,11 are scheduled radio resources for a first attempt transmission. The radio base station 12 may only be able to successfully decode the transmission of one of the user equipments, e.g. the second user equipment 11. The first user equipment 10, for which the transmission was not successfully received, will then do a retransmission. In e,g. LTE there are two types of retransmissions, a non-adaptive and an adaptive retransmission. The non-adaptive retransmission means that the radio base station 12 does not transmit a grant to the first user equipment 10 for the retransmission. The first user equipment 10 makes the retransmission on the resources that were indicated for the first transmission attempt. With frequency hopping type 2 the mapping to physical resource allocation might be different from the first transmission attempt. With a non-adaptive retransmission, there may be unused radio resources in the frequency spectrum. The adaptive retransmission means that the radio base station 12 sends a grant for the retransmission in which the radio base station 12 may make another resource indication than the resource indication the radio base station 12 did for the first transmission attempt. Thus by sending an adaptive grant for the retransmission and change the resource allocation of the first user equipment 10 based on the frequency hopping scheme of the second user equipment 11 the frequency spectrum will be efficiently used. Another way to solve it is to take the frequency position of the first user equipment 10 with a valid grant for retransmission into account in the scheduling, i.e. by taking the frequency positions of retransmitting user equipments into consideration when doing the grouping of user equipments and allocation of radio resources. Thus, the radio base station 12 may take scheduled retransmission to the first user equipment 10 into account when allocating the radio resource to the second user equipment 11. It should be noted that it may not only be the retransmissions scheduled to the first user equipment 10 that is of interest, but the retransmissions of all user equipments with an intra subframe hopping scheme within the cell.

Figure 5:
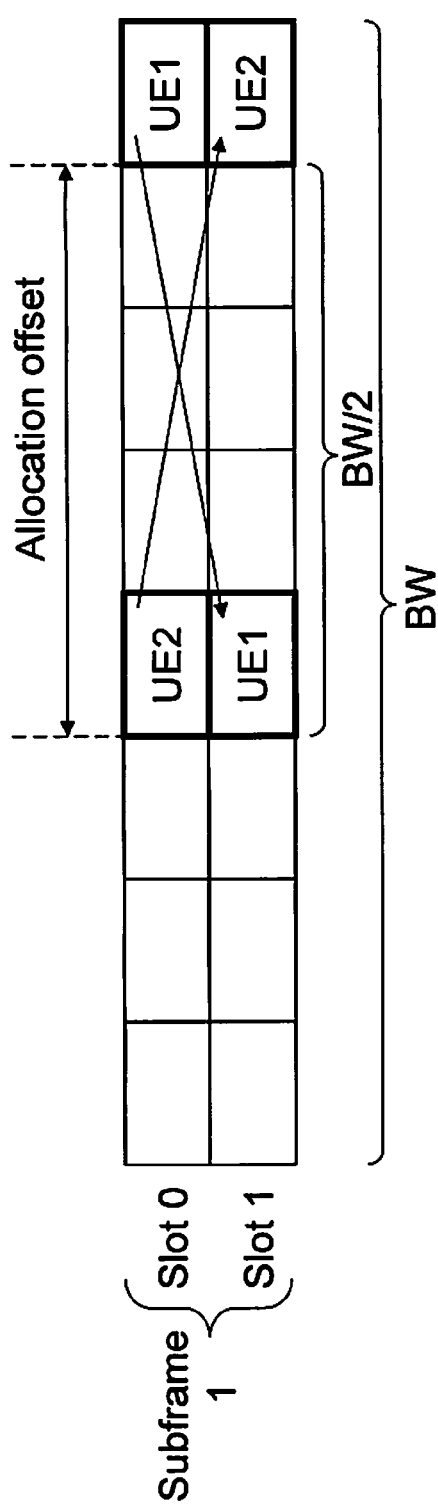
FIG. 5 is a block diagram depicting resource allocation in a radio communications network.

FIG. 5 is a block diagram of an allocation of radio resources in a radio communications network according to embodiments herein. The allocation of radio resources may be performed by utilizing the Relative Allocation Offset (RAO) value, also referred to as a allocation offset—The RAO may be calculated based on e.g. a Physical Uplink Shared Channel (PUSCH) bandwidth, the type of hopping, and the number of user equipments (UE) that are configured for intra-subframe hopping:

RAO=$f$(BW, hopping type, number of UEs)

For example, assume a system with PUSCH bandwidth=BW<50 Physical Resource Blocks (PRB), using Type 1 hopping, and given two user equipments that are configured with intra-subframe hopping. In this case, if the allocation of the first user equipment 10 starts at PRB=X, then the next PRB for that same first user equipment 10 will be allocated at PRB=(X+BW/2). The frequency hopping value is set to BW/2 when the available bandwidth is less than 50 PRBs. In this case, the RAO value calculated is BW/2, which RAO will result in that the first user equipment 10 and the second user equipment 11 utilizes complementary time slots in a given subframe. This is shown in FIG. 5, and as a result, the user equipments 10, 11 using frequency hopping schemes will not block any frequency spectrum for user equipments, which uses or not uses a frequency hopping scheme.

In case that an available bandwidth BW is larger than or equal to 50 PRBs, then it is possible to jump with not only a factor of ½, i.e. BW/2, but also +¼ and −¼. For example, if the first user equipment 10 is to use, configured from the radio base station 12, a frequency hopping scheme with a factor of +¼ BW and has a first PRB allocated at PRB=X in time slot 0, then next PRB will be allocated at PRB=(X+BW/4) in time slot 1. As such, the second user equipment 11 should have a RAO=BW/4 and be configured to hop with a factor of −¼. Thus, the allocation of the radio resource to the second user equipment 11 may also be based on the frequency hopping scheme of the second user equipment 11. In other words, the radio base station 12 allocates a radio resource to the second user equipment 11 so that the physical radio resource in the first time slot allocated to the second user equipment 11 is the same physical radio resource allocated in the second time slot to the first user equipment 10 when using a frequency hopping scheme and vice versa, i.e. the second physical radio resource of the second user equipment 11 is the same as the first radio resource of the first user equipment 10. The radio base station 12 may in some embodiments then take into account which physical radio resource allocated to the first user equipment 10 as well as frequency hopping scheme of the first user equipment in combination with the frequency hopping scheme of the second user equipment.

The allocated radio resource, or an indication which radio resource is allocated, is then transmitted in the scheduling grant as virtual radio resources also referred to as virtual resource blocks (VRB).

Figure 6:
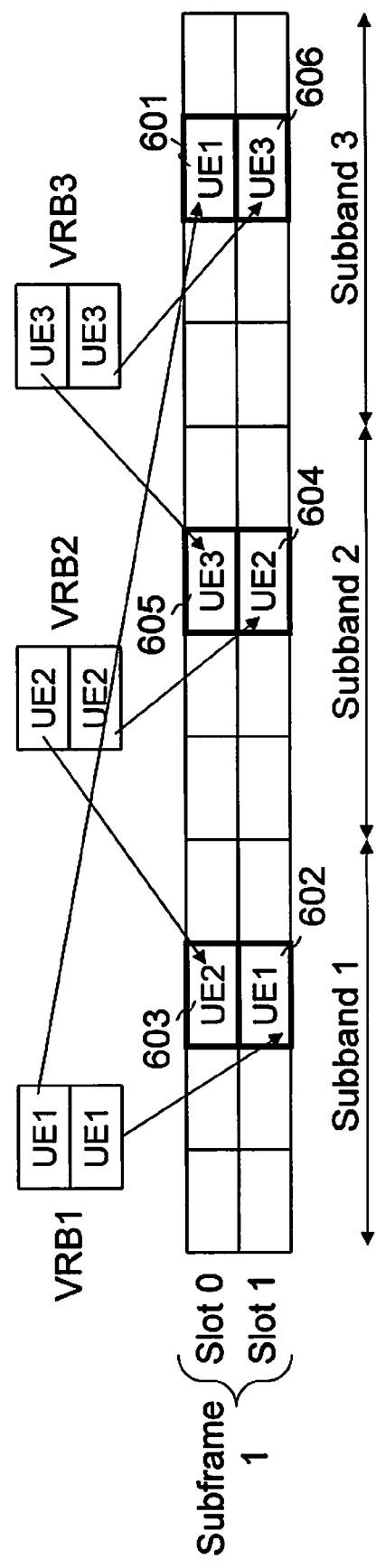
FIG. 6 is a block diagram depicting resource allocation in a radio communications network.

FIG. 6 is a block diagram of an allocation of radio resources in a radio communications network. FIG. 6 shows frequency hopping with three user equipments using Type 2 PUSCH frequency hopping with the PUSCH bandwidth divided into 3 subbands. A first subband, a second subband, and a third subband.

A first block of Virtual Resource Blocks (VRB) is allocated to the first user equipment 10, denoted as VRB1. A second block of Virtual Resource Blocks (VRB) is allocated to the second user equipment 11, denoted as VRB2. A third block of Virtual Resource Blocks (VRB) is allocated to a third user equipment, denoted as VRB3. A physical resource block allocated to the first user equipment 10 is denoted UE1, a physical resource block allocated to the second user equipment 11 is denoted UE2, and a physical resource block allocated to the third user equipment is denoted UE3. An allocated virtual resource allocation results in one physical resource allocation in the first time slot and one physical resource allocation in the second time slot In case of Type 2, frequency hopping will be done based on cell-specific parameters resulting in a cell specific hopping and mirroring pattern. FIG. 6 shows one example where frequency hopping is done among the three user equipments. As a result of disclosed embodiments herein the user equipments will use each others' complementary radio resources of the different time slots. That is, the first VRB of the first user equipment 10 is mapped to a radio resource 3 601 in the third subband in a first time slot, slot 0. The first user equipment 10 follows a frequency hopping type 2, wherein the first user equipment 10 is configured to jump between a certain number of subbands. The number of subbands is configured by the radio base station 12. How the first user equipment 10 jumps between the subbands, is decided by a predefined pattern. In this example, the number of subbands is 3 and the first user equipment 10 jumps one subband, Thus, the second VRB of the first user equipment 10 is mapped to a radio resource 602 in the first subband in a second time slot, slot 1. The first VRB of the second user equipment 11 is mapped to a radio resource 603 in the first subband in the first time slot being the radio resource of the first user equipment 10 in the second time slot. The second user equipment 11 follows a same frequency hopping scheme, thus the second VRB of the second user equipment 11 is mapped to a radio resource 604 in the second subband. The first VRB of the third user equipment is mapped to a radio resource 605 in the second subband in the first time slot being the radio resource of the second user equipment 10 in the second time slot. The third user equipment 11 follows a same frequency hopping scheme, thus the second VRB of the third user equipment is mapped to a radio resource 606 in the third subband. Thus, the radio resources are efficiently utilized. The RAO is the difference between the virtual resource block allocation of user equipment 10 and second user equipment 11 and the third user equipment which in this case is BW/3.

Embodiments herein disclose the allocation of a radio resource to the second user equipment 11 so that the physical resource in the second time slot coincides with the physical resource of the first user equipment in the first time slot and vice versa. Thus, the physical radio resource allocation is based on the frequency hopping scheme or algorithm used by the first user equipment and in some embodiments also the frequency scheme of the second user equipment. This applies for both the first time slot, slot 0, and the second time slot, slot 1.

Figure 7:
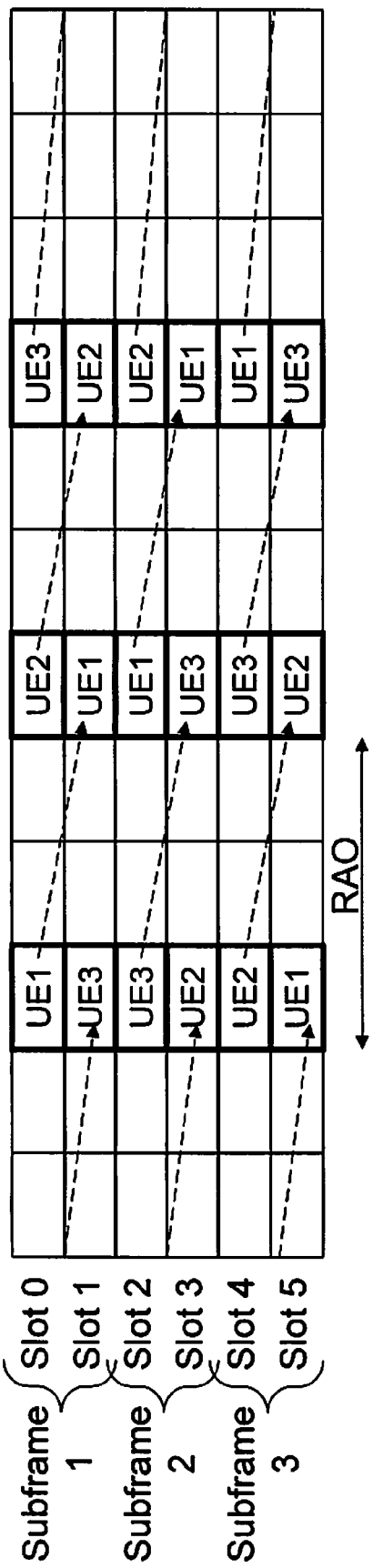
FIG. 7 is a block diagram depicting resource allocation in a radio communications network.
Figure 8:
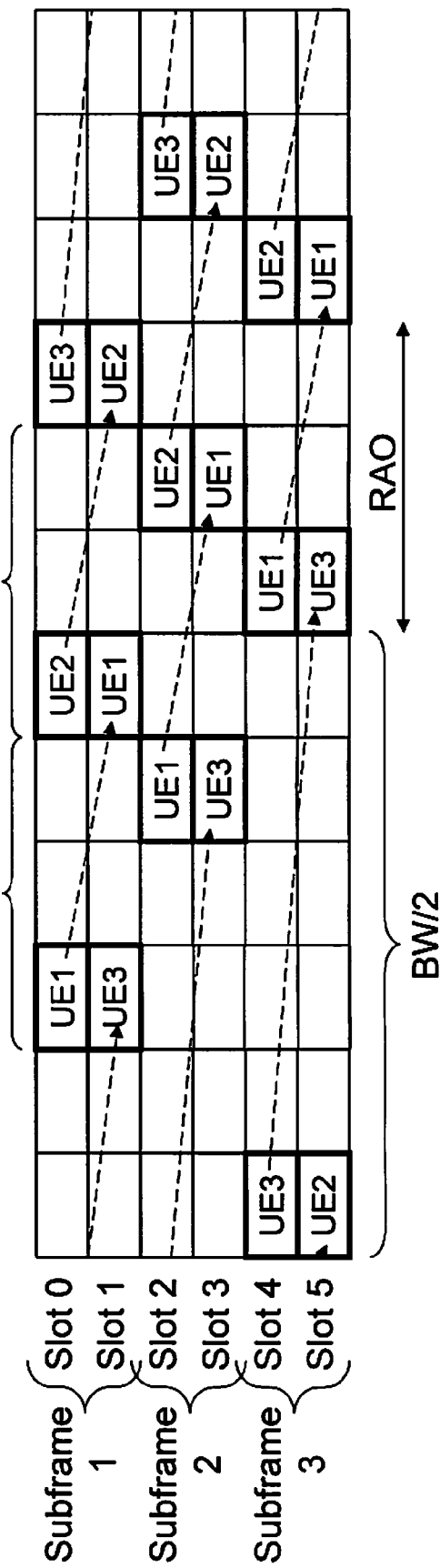
FIG. 8 is a block diagram depicting resource allocation in a radio communications network.

In the above, we have presented a method for efficient frequency spectrum utilization that is compliant with the 3GPP standard. However, the same idea would still work even with non 3GPP compliant hopping schemes, as long as the different user equipments or user equipment groups jump with the same frequency hop, which is a practical condition, in order to ensure tractability of the frequency hopping. FIGS. 7-8 are bock diagrams depicting radio resource allocations between three user equipments. A radio resource of the first user equipment 10 is denoted UE1, a radio resource of the second user equipment 11 is denoted UE2, and a radio resource of the third user equipment is denoted UE3.

As stated, three user equipments are configured for frequency hopping or alternatively 3 groups of user equipments and two different alternatives are disclosed in FIGS. 7-8. The first subframe in both alternatives is similar, and is like that of the 3GPP compliant Type 1 hopping. The difference is in subsequent subframes.

It may be desirable to have a frequency hopping scheme where it is possible to hop to new resource allocations in consecutive or subsequent subframes in order to further increase the frequency diversity. This is illustrated in FIGS. 7-8. We illustrate this assuming a grant that is valid for three consecutive subframes, and utilizing some variant of the Type 1 PUSCH hopping. The difference with the 3GPP compliant Type 1 hopping as shown in FIG. 6 is that the frequency hopping scheme uses here a hop with a certain offset with respect to the slot from the previous valid subframe or based on the grant information for the first slot in the first subframe, i.e. slot 0.

In FIG. 7, a Relative Allocation Offset is used as BW/4 which is the frequency hopping offset of the frequency hopping scheme used in the cell. A resource offset between subframe 2 and subframe 1 is equal to the frequency hopping scheme, thus creating a group of hopping subbands that will be the same throughout the validity of the grant. The frequency hopping scheme is user equipment specific in this case. In subframe 1, the first user equipment 10 and the second user equipment 11, use a frequency hopping with +BW/4, but the third user equipment hops with +BW/2. In subframe 2, it is the second user equipment 11 that hops with +BW/2 and in subframe 3, it is the first user equipment that hops with +BW/2.

In FIG. 8, a RAO is used of BW/4 which is the frequency hopping offset of the frequency hopping scheme used in the cell. The resource offset between subframe 2 and subframe 1, or slot 2 and slot 0, is different from the RAO which will create more interference and frequency diversity than the 3GPP type 1 scheme and the scheme illustrated in FIG. 7. The first user equipment 10 and the second user equipment 11 is using a frequency hopping scheme of BW/4 and the third user equipment is using a frequency hopping scheme of BW/2. There are twelve resource blocks and first and second user equipment hops three resource blocks and the third user equipment hops six resource blocks.

However, even if the allocations are different in FIGS. 7-8 both disclose the utilization of a RAO that allocates radio resources to user equipments properly in frequency. The embodiments disclosed herein avoid losses in the frequency spectrum due to the utilization of e.g. intra-subframe frequency hopping, and provides a method of efficiently sharing the frequency spectrum between hopping and non-hopping user equipments.

Figure 9:
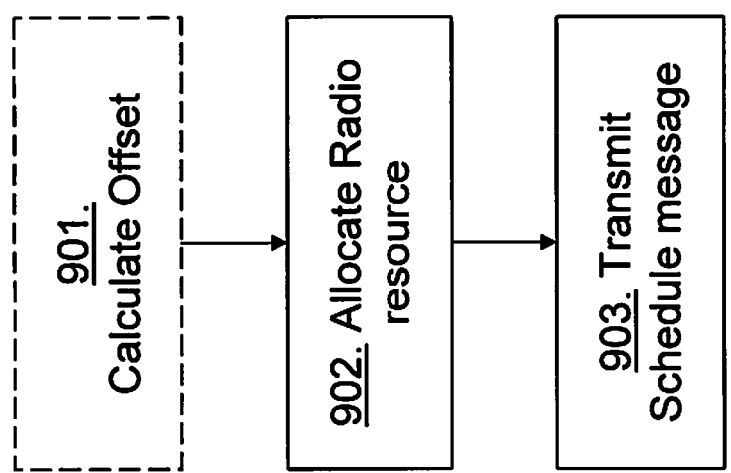
FIG. 9 is a flowchart of a method in a radio base station in a radio communications network.

The method steps in the radio base station 12 for transmitting information of an allocation of a radio resource allocated to a second user equipment 11 according to some general embodiments will now be described with reference to a flowchart depicted in FIG. 9. The steps do not have to be taken in the order stated below, but may be taken in any suitable order. The radio base station 12 is arranged to serve a first user equipment 10 and the second user equipment 11 in a cell 14 of a radio communications network. The radio resource in the cell 14 comprises Physical Resource Blocks that are organized in radio frames comprising subframes.

Step 901. The radio base station 12 may calculate an offset value based on the frequency hopping scheme of the first user equipment 10 in the cell 14. Such an offset value may be a RAO value.

In some embodiments the offset value may further be based on a number of user equipments that is configured with frequency hopping of an intra subframe type and/or a bandwidth of a shared channel comprising the radio resource. Intra-subframe type means that the allocated radio resources of a first time slot of a subframe is different to the allocated radio resources of a second time slot of the subframe.

Step 902. The radio base station 12 allocates a radio resource to the second user equipment 11 in a subframe of the cell 14 based on a frequency hopping scheme of the first user equipment 10.

In some embodiments the step of allocating 902 is further based on a frequency hopping scheme of the second user equipment 11 in combination with the frequency hopping scheme of the first user equipment 10.

In some embodiments, the subframes in the radio frames may comprise time slots and the radio base station 12 allocates a first physical radio resource of a first time slot of the subframe and a second physical radio resource of a second time slot according to a frequency hopping scheme of the second user equipment 11. The first physical radio resource may then be a same physical radio resource that has been allocated to the first user equipment 10 in the second time slot, which is based on the frequency hopping scheme of the first user equipment 10.

In some embodiments where the radio base station 12 has calculated an offset value, the radio base station 12 allocates the radio resource based on the offset value relative to a radio resource allocated to the first user equipment in the subframe.

In some embodiments, the radio base station 12 further takes a number of transmission time intervals of a radio resource scheduled to the first user equipment (10) into account when allocating the radio resource.

In some embodiments, the second user equipment (11) is comprised in a second group of user equipments and the second group of user equipments including the second user equipment (11) is allocated the radio resource based on a frequency hopping scheme of a first group comprising the first user equipment (10).

Step 903. The radio base station transmits a message to the second user equipment 11, which message indicates the allocated radio resource.

The radio resources in the cell is thereby used in an efficient manner as radio resources within a subframe is efficiently utilized Note that although the illustrations may focus on Type 1 hopping, the exact same limitations apply to Type 2 hopping as well.

Figure 10:
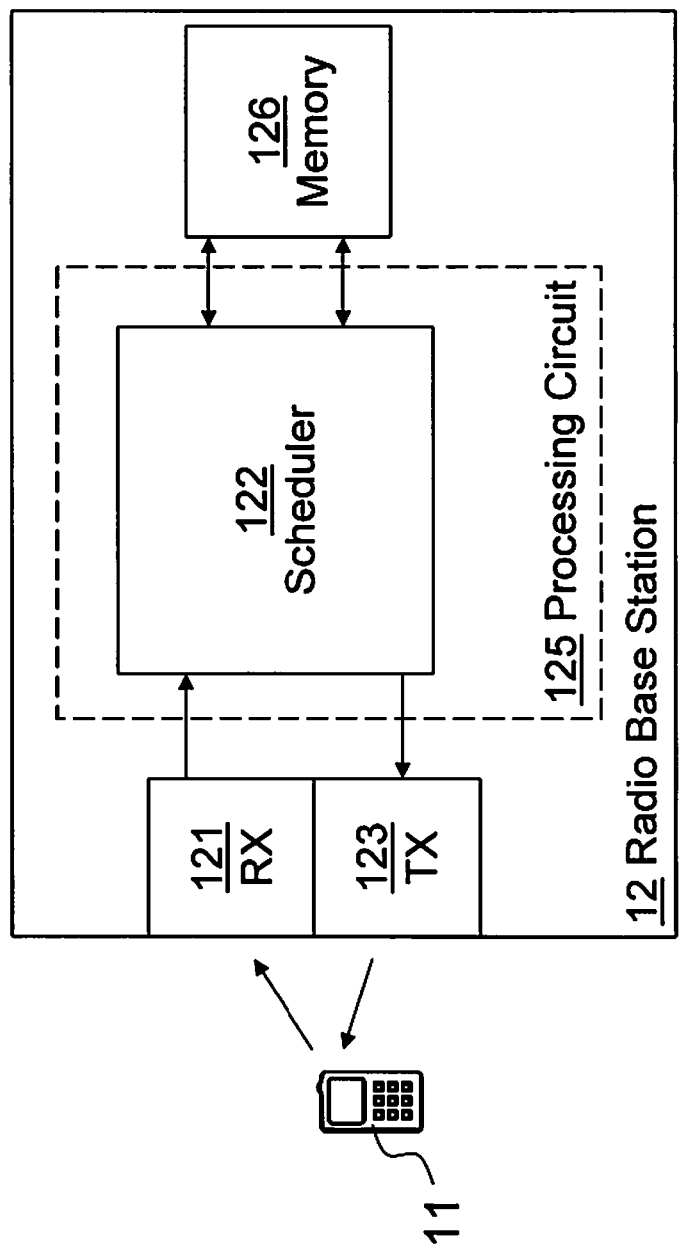
FIG. 10 is a block diagram depicting a radio base station.

In order to perform the method steps above for transmitting information of the allocation of the radio resource allocated to the second user equipment 11 the radio base station 12 comprises an arrangement depicted in FIG. 10. FIG. 10 discloses the radio base station 12 for transmitting information of an allocation of a radio resource allocated to the second user equipment 11 according to some general embodiments. The radio base station 12 is arranged to serve a first user equipment 10 and the second user equipment 11 in a cell 14 of a radio communications network. The radio resource in the cell 14 comprises Physical Resource Blocks that are organized in radio frames comprising subframes.

In some embodiments the radio base station may comprise a receiver 121 configured to receive scheduling requests or similar from the first 10 and the second user equipment 11. The radio base station 12 may then schedule radio resources to the first user equipment 10.

The radio base station 12 comprises a scheduler 122 configured to allocate a radio resource to the second user equipment 11 in a subframe of the cell 14 based on a frequency hopping scheme of the first user equipment 10. The scheduler 122 may in some embodiments be configured to allocate the radio resource based on a frequency hopping scheme of the second user equipment 11 in combination with the frequency hopping scheme of the first user equipment 10.

In some embodiments the subframes of the radio frames comprises time slots and the scheduler 122 is further configured to allocate a first physical radio resource of a first time slot of the subframe and a second physical radio resource of a second time slot according to a frequency hopping scheme of the second user equipment 11. The first physical radio resource is a same physical radio resource allocated to the first user equipment 10 in the second time slot, which is based on the frequency hopping scheme of the first user equipment 10.

The scheduler 122 may further be configured to calculate an offset value based on the frequency hopping scheme of the first user equipment 10 in the cell 14. The scheduler 122 may then be configured to allocate the radio resource to the second user equipment 11 based on the offset value relative to a radio resource allocated to the first user equipment 10 in the subframe. The offset value may further be based on a number of user equipments that is configured with frequency hopping of an intra subframe type and/or a bandwidth of a shared channel comprising the radio resource.

In some embodiments the scheduler 122 is further configured to take a number of transmission time intervals of a radio resource scheduled to the first user equipment 10 into account when allocating the radio resource.

The second user equipment 11 may be comprised in a second group of user equipments and the scheduler 122 may be configured to allocate the radio resource to the second group of user equipments including the second user equipment 11 based on a frequency hopping scheme of a first group including the first user equipment 10.

The radio base station 12 further comprises a transmitter 123 configured to transmit a message to the second user equipment 11, which message indicates the allocated radio resource.

The embodiments herein for allocating the radio resource to the second user equipment 10 may be implemented through one or more processors, such as a processing circuit 125 in the radio base station 12 depicted in FIG. 10, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Furthermore, the radio base station 12 may comprise a memory 126. The memory 126 may comprise one or more memory units and may be used to store for example data such as scheduling schemes, allocation data, groups of user equipments, scheduling grants, and applications to perform the methods herein when being executed on the radio base station 12 or similar.

Figure 11:
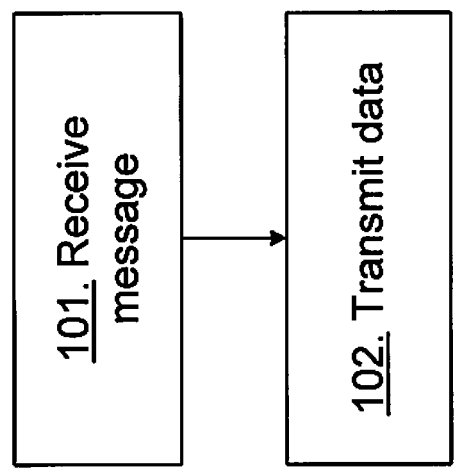
FIG. 11 is a flowchart of a method in a second user equipment in a radio communications network.

The method steps in the second user equipment 11 for receiving information of an allocation of a radio resource allocated to the second user equipment 11 in a radio communications network according to some general embodiments will now be described with reference to a flowchart depicted in FIG. 11. The steps do not have to be taken in the order stated below, but may be taken in any suitable order.

In the radio communications network a radio base station 12 serves a first user equipment 10 and the second user equipment 11 in a cell 14 of the radio communications network. The radio resource in the cell 14 comprises Physical Resource Blocks that are organized in radio frames comprising subframes.

Step 101. The second user equipment 11 receives a message from the radio base station 12. The message indicates an allocated radio resource, and the radio resource has been allocated to the second user equipment 11 in a subframe of the cell 14 based on a frequency hopping scheme of the first user equipment 10.

Step 102. The second user equipment 11 then transmits data to the radio base station 12 using the allocated radio resource.

Figure 12:
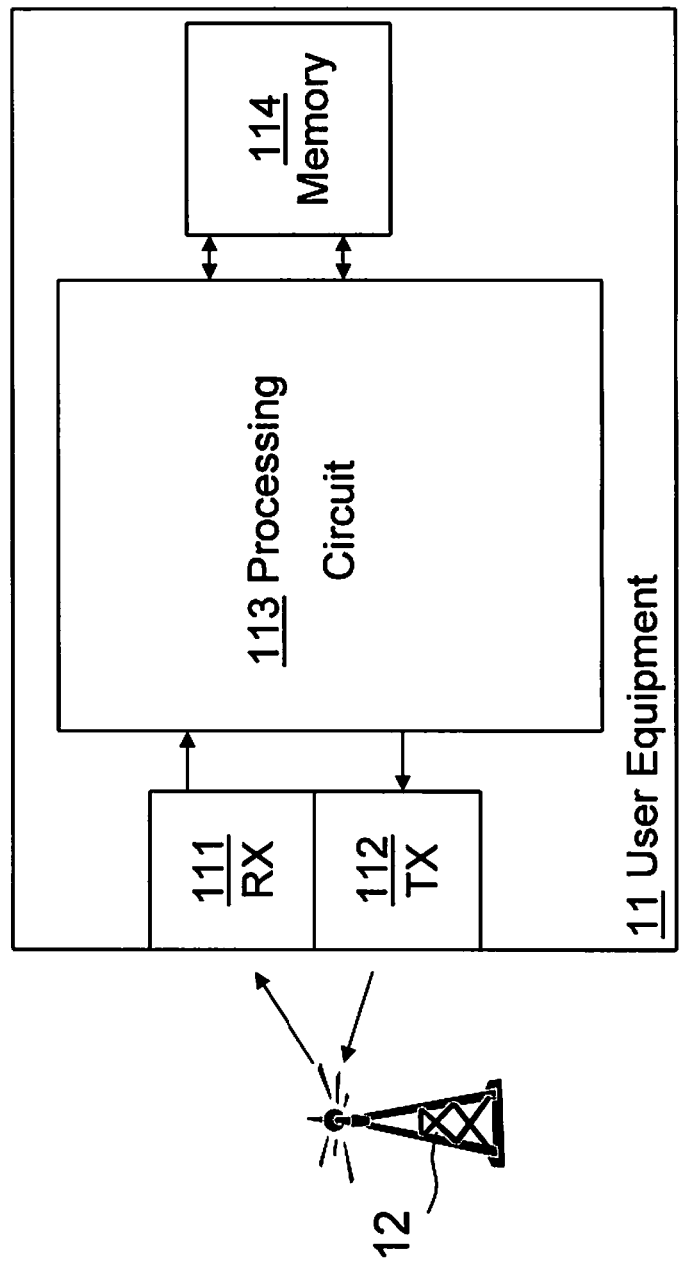
FIG. 12 is a block diagram depicting a second user equipment.

In order to perform the method steps above for receiving information of an allocation of a radio resource allocated to the second user equipment 11 in a radio communications network the second user equipment 11 comprises an arrangement depicted in FIG. 12. FIG. 12 discloses the second user equipment 11 for receiving information of an allocation of a radio resource allocated to the second user equipment 11 in a radio communications network according to some general embodiments. The second user equipment 11 is configured to be served in a cell 14 controlled by the radio base station 12, which cell 14 also serves a first user equipment 10. The radio resource in the cell 14 comprises Physical Resource Blocks that are organized in radio frames comprising subframes. The second user equipment 11 comprises a receiver 111 configured to receive a message from the radio base station 12. The message indicates an allocated radio resource, which radio resource has been allocated to the second user equipment 11 in a subframe of the cell 14 based on a frequency hopping scheme of the first user equipment 10.

Furthermore, the second user equipment 11 comprises a transmitter 112 configured to transmit data to the radio base station 12 using the allocated radio resource.

The embodiments herein for receiving information of an allocation of a radio resource allocated to the second user equipment 11 in a radio communications network may be implemented through one or more processors, such as a processing circuit 113 in the second user equipment 11 depicted in FIG. 12, together with computer program code for performing the functions and/or method steps of the embodiments herein. The program code mentioned above may also be provided as a computer program product, for instance in the form of a data carrier carrying computer program code for performing the present solution when being loaded into the second user equipment 11. One such carrier may be in the form of a CD ROM disc. It is however feasible with other data carriers such as a memory stick. The computer program code may furthermore be provided as pure program code on a server and downloaded to the second user equipment 11.

Furthermore, the second user equipment 11 may comprise a memory 114. The memory 114 may comprise one or more memory units and may be used to store for example data such as synchronization clock, time information, scheduling information, and applications to perform the methods herein when being executed on the second user equipment 11 or similar.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station for transmitting information of an allocation of a radio resource allocated to a second user equipment, which radio base station is arranged to serve a first user equipment and the second user equipment in a cell of a radio communications network; the radio resource in the cell comprises Physical Resource Blocks that are organized in radio frames comprising subframes, and wherein the method comprises:

allocating a radio resource to the second user equipment in a subframe of the cell based on a frequency hopping scheme and a radio resource allocation of the first user equipment and further based on a frequency hopping scheme of the second user equipment to cause the radio resource allocated to the second user equipment to be a time shifted portion of the radio resource allocation of the first user equipment; and transmitting a message to the second user equipment, which message indicates the allocated radio resource.

2. The method according to claim 1, wherein the subframes in the radio frames comprise time slots and the step of allocating comprises in each of a sequence of the time slots allocating a physical radio resource of the time slot to the second user equipment that was used by the first user equipment in a previous one of the time slots.

3. The method according to claim 1, wherein the subframes in the radio frames comprise time slots and the step of allocating comprises allocating a first physical radio resource of a first time slot of the subframe and a second physical radio resource of a second time slot according to the frequency hopping scheme of the second user equipment, wherein the first physical radio resource is a same physical radio resource that has been allocated to the first user equipment in the second time slot, which is based on the frequency hopping scheme of the first user equipment.

4. The method according to claim 1, further comprising calculating an offset value based on the frequency hopping scheme of the first user equipment in the cell, and wherein the step of allocating is based on the offset value relative to a radio resource allocated to the first user equipment in the subframe.

5. The method according to claim 4, wherein the offset value is further calculated based on a number of user equipments that is configured with frequency hopping of an intra subframe type and/or a bandwidth of a shared channel comprising the radio resource.

6. The method according to claim 1, wherein the step of allocating further takes a number of transmission time intervals of a radio resource scheduled to the first user equipment into account.

7. The method according to claim 1, wherein the second user equipment is comprised in a second group of user equipments and the second group of user equipments including the second user equipment is allocated the radio resource based on a frequency hopping scheme of a first group comprising the first user equipment.

8. A radio base station for transmitting information of an allocation of a radio resource allocated to a second user equipment, which radio base station is arranged to serve a first user equipment and the second user equipment in a cell of a radio communications network, and the radio resource in the cell comprises Physical Resource Blocks that are organized in radio frames comprising subframes, wherein the radio base station comprises:

a scheduler configured to allocate a radio resource to the second user equipment in a subframe of the cell based on a frequency hopping scheme and a radio resource allocation of the first user equipment and further based on a frequency hopping scheme of the second user equipment to cause the radio resource allocated to the second user equipment to be a time shifted portion of the radio resource allocation of the first user equipment; and a transmitter configured to transmit a message to the second user equipment, which message indicates the allocated radio resource.

9. The radio base station according to claim 8, wherein the subframes in the radio frames comprise time slots and the scheduler is configured to allocate in each of a sequence of the time slots a physical radio resource of the time slot to the second user equipment that was used by the first user equipment in a previous one of the time slots.

10. The radio base station according to claim 8, wherein the subframes of the radio frames comprise time slots and the scheduler is further configured to allocate a first physical radio resource of a first time slot of the subframe and a second physical radio resource of a second time slot according to the frequency hopping scheme of the second user equipment, wherein the first physical radio resource is a same physical radio resource allocated to the first user equipment in the second time slot, which is based on the frequency hopping scheme of the first user equipment.

11. The radio base station according to claim 8, wherein the scheduler is further configured to calculate an offset value based on the frequency hopping scheme of the first user equipment in the cell, and wherein the scheduler is configured to allocate the radio resource to the second user equipment based on the offset value relative to a radio resource allocated to the first user equipment in the subframe.

12. The radio base station according to claim 11, wherein the offset value is further based on a number of user equipments that is configured with frequency hopping of an intra subframe type and/or a bandwidth of a shared channel comprising the radio resource.

13. The radio base station according to claim 8, wherein the scheduler is further configured to take a number of transmission time intervals of a radio resource scheduled to the first user equipment into account when allocating the radio resource.

14. The radio base station according to claim 8, wherein the second user equipment is comprised in a second group of user equipments and the scheduler is configured to allocate the second group of user equipments including the second user equipment the radio resource based on a frequency hopping scheme of a first group including the first user equipment.

* * * * *

UNITED STATES PATENT AND TRADEMARK OFFICE
CERTIFICATE OF CORRECTION

PATENT NO.         : 8,908,742 B2                                        Page 1 of 1
APPLICATION NO.    : 13/985914
DATED              : December 9, 2014
INVENTOR(S)        : Jersenius et al.

It is certified that error appears in the above-identified patent and that said Letters Patent is hereby corrected as shown below:

In the Specification,

In Column 1, Line 44, delete "Modem" and insert -- Modern --, therefor.

In Column 2, Line 22, delete "ills" and insert -- TTIs --, therefor.

In Column 6, Line 22, delete "Ills." and insert -- TTIs. --, therefor.

In Column 8, Line 24, delete "subband," and insert -- subband. --, therefor.

In Column 8, Line 36, delete "equipment 10" and insert -- equipment 11 --, therefor.

In Column 11, Line 40, delete "equipment 10" and insert -- equipment 11 --, therefor.

Signed and Sealed this
Thirtieth Day of June, 2015

Michelle K. Lee
*Director of the United States Patent and Trademark Office*